United States Patent
Ren et al.

(10) Patent No.: US 11,792,758 B2
(45) Date of Patent: Oct. 17, 2023

(54) METHOD AND DEVICE FOR DETERMINING TIMING ADVANCE

(71) Applicant: DATANG MOBILE COMMUNICATIONS EQUIPMENT CO., LTD., Beijing (CN)

(72) Inventors: Bin Ren, Beijing (CN); Deshan Miao, Beijing (CN); Shaohui Sun, Beijing (CN); Shaoli Kang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 169 days.

(21) Appl. No.: 17/430,325

(22) PCT Filed: Jan. 15, 2020

(86) PCT No.: PCT/CN2020/072323
§ 371 (c)(1),
(2) Date: Aug. 12, 2021

(87) PCT Pub. No.: WO2020/164362
PCT Pub. Date: Aug. 20, 2020

(65) Prior Publication Data
US 2022/0150858 A1    May 12, 2022

(30) Foreign Application Priority Data

Feb. 14, 2019 (CN) .......................... 201910115060.0
Mar. 12, 2019 (CN) .......................... 201910185664.2

(51) Int. Cl.
*H04W 56/00* (2009.01)
*H04L 27/26* (2006.01)
(Continued)

(52) U.S. Cl.
CPC .... *H04W 56/0045* (2013.01); *H04B 7/18517* (2013.01); *H04B 7/18589* (2013.01);
(Continued)

(58) Field of Classification Search
None
See application file for complete search history.

(56) References Cited

U.S. PATENT DOCUMENTS 9,749,035 B2 *  8/2017  Vasavada ............... H04B 7/195
10,057,867 B2 *  8/2018  Ruffini ................. H04W 56/001
(Continued)

FOREIGN PATENT DOCUMENTS

CN        102231917 B        5/2015
CN        107197517 A        9/2017
(Continued)

OTHER PUBLICATIONS

Thales, IDC, "NR-NTN: solution principles for NR to support non-terrestrial networks", 3GPP TSG RAN1 Meeting #93, Busan, Korea, May 21-May 25, 2018, total 12 pages, R1-1807864.
(Continued)

*Primary Examiner* — Faiyazkhan Ghafoerkhan
(74) *Attorney, Agent, or Firm* — KILPATRICK TOWNSEND & STOCKTON, LLP

(57) ABSTRACT

The embodiments of the present application relate to a method and device for determining a timing advance, applied to the establishment of a timing advance in a random access process of an NTN system. The method in the embodiments of the present application includes: receiving and acquiring relevant parameters in a configuration message, and the relevant parameters include cell common time delay information; and determining, according to the cell common time delay information, an uplink timing advance of an uplink transmission timing position with respect to a
(Continued)

configuration message receiving position. With regard to cell common time delay information existing in the NTN system, an uplink transmission timing position is determined, and a PRACH Preamble is sent in advance, so that the problem when applied to the establishment of the timing advance in the random access process of the NTN system is solved, and the calculation accuracy of the timing advance in a data transmission process after the random access process is ensured.

19 Claims, 9 Drawing Sheets

(51) Int. Cl.
 *H04B 7/185* (2006.01)
 *H04W 74/08* (2009.01)
 *H04W 84/06* (2009.01)

(52) U.S. Cl.
 CPC .... *H04L 27/2607* (2013.01); *H04L 27/26025* (2021.01); *H04W 56/001* (2013.01); *H04W 56/0005* (2013.01); *H04W 56/006* (2013.01); *H04W 74/0833* (2013.01); *H04W 84/06* (2013.01)

(56) References Cited

U.S. PATENT DOCUMENTS

| | | | |
|---|---|---|---|
| 10,383,150 B2* | 8/2019 | Babaei | H04W 24/08 |
| 11,546,726 B2* | 1/2023 | Speidel | H04L 27/266 |
| 11,581,939 B2* | 2/2023 | Li | H04L 27/2605 |
| 11,588,546 B2* | 2/2023 | Montgomery | H04B 7/2048 |
| 11,595,906 B2* | 2/2023 | Dinan | H04L 5/0053 |
| 2015/0270890 A1* | 9/2015 | Vasavada | H04B 7/195 370/326 |
| 2016/0174177 A1* | 6/2016 | Frederiksen | H04W 72/12 370/329 |
| 2017/0245228 A1* | 8/2017 | Ruffini | H04L 12/2801 |
| 2017/0332410 A1* | 11/2017 | Babaei | H04W 72/0446 |
| 2018/0324768 A1* | 11/2018 | Shaheen | H04L 5/0053 |
| 2020/0275398 A1* | 8/2020 | Da | H04L 5/0092 |
| 2022/0150858 A1* | 5/2022 | Ren | H04W 74/0833 |

FOREIGN PATENT DOCUMENTS

| | | |
|---|---|---|
| CN | 107333241 A | 11/2017 |
| CN | 107528628 A | 12/2017 |
| JP | 2010530648 A | 9/2010 |
| JP | 2017522760 A | 8/2017 |

OTHER PUBLICATIONS

Nomor Research GmbH, Thales, "Considerations on MAC Timers and on RTD Compensation Offset in NonTerrestrial Networks (NTN)", 3GPP TSG-RAN WG2 Meeting #104, Spokane, USA, Nov. 12-15, 2018, total 5 pages, R2-1818511.

Thales, "NR-NTN: Impact on initial TA during random access procedure", 3GPP TSG RAN1 Meeting #93, Busan, Korea, May 21-May 25, 2018, total 5 pages, R1-1806476.

Thales et al., "NR-NTN: TP for Chap 7.3 NR modifications to support NTN", 3GPP TSG RAN Meeting #80, La Jolla, USA, Jun. 11-Jun. 14, 2018, total 37 pages, RP-180658.

Thales, "NR-NTN: update on chap 4.8 spectrum and related chapters", 3GPP TSG RAN Meeting #80, La Jolla, USA, Jun. 11-Jun. 14, 2018, total 8 pages, RP-180661.

* cited by examiner

METHOD AND DEVICE FOR DETERMINING TIMING ADVANCE

CROSS-REFERENCE TO RELATED APPLICATIONS

The present application is a National Stage of International Application No. PCT/CN2020/072323, filed on Jan. 15, 2020, which claims priorities to the Chinese Patent Application No. 201910115060.0, filed to the Chinese Patent Office on Feb. 14, 2019, and entitled 'Method and device for determining timing advance', and to the Chinese Patent Application No. 201910185664.2, filed to the Chinese Patent Office on Mar. 12, 2019, and entitled 'Method and device for determining timing advance', the entire contents of which are incorporated herein by reference.

FIELD

The present application relates to the field of non-terrestrial networks (NTNs), in particular to a method and device for determining a timing advance.

BACKGROUND

An NTN includes a satellite communication system, has a cell radius far larger than that of a conventional cellular communication system, introduces ultra-large propagation time delay, and has two following types of random access synchronization time delay aiming at a specific downlink beam covering a cell by the satellite communication system.

One is a common transmission time delay, as shown in FIG. 1, a terminal 1 receives a global positioning system (GPS) signal of a satellite 3 and performs accurate positioning, where the common transmission time delay is twice as long as a minimum link time delay T1 and a feeder link time delay T2 between terminals 1 located closest to the satellite 3, namely 2(T1+T2), and the feeder link time delay T2 is the feeder link time delay between the satellite 3 and a gateway station 2.

The other is a relative transmission time delay, as shown in FIG. 2, in the same beam, the time delay T3 corresponding to a propagation distance difference d3 between a user link propagation path of the terminal and the minimum link time delay path closest to the satellite 1 is the relative transmission time delay.

In a new radio (NR) system, for all physical random access channel (PRACH) Preambles, a current downlink timing position is taken as a reference timing position, and there is no timing advance at an uplink transmission timing position, the formula is as follows:

$$T_{TX,PRACH}{}^n = T_{PRACH,Reference}{}^n - (N_{TA} + N_{TA\ offset}).$$

where $N_{TA}=0$, i.e. the timing advance is zero, $T_{PRACH,Reference}{}^n$ is the timing reference position at which the terminal starts transmitting an uplink subframe of PRACH Preamble, $T_{TX,PRACH}{}^n$ is the time at which the terminal starts transmitting PRACH Preamble, n is a subframe number, and $N_{TA\ offset}$ is a time interval in which a base station converts from receiving the signal to transmitting the signal in a time division duplexing (TDD) duplex mode, and $N_{TA\ offset}=0$ for a frequency division duplexing (FDD) system.

At present, in a process of establishing a timing advance, the timing advance of the uplink transmission timing position is not considered, and due to the two transmission time delays existing in the above-mentioned NTN system, if the starting transmission moment of the uplink PRACH Preamble is determined by using the above formula, the determined starting transmission moment of the uplink PRACH Preamble is delayed and cannot be applied to the NTN system. In summary, at present, there is no timing advance establishment mechanism and maintenance mechanism suitable for the NTN system.

SUMMARY

The present application provides a method and device for determining a timing advance, configured to realize a timing advance establishing mechanism to meet a random access process of an NTN system.

In one embodiment of the present application provides a method for determining a timing advance by a terminal. The method includes: receiving and acquiring relevant parameters in a configuration message, where the relevant parameters include cell common time delay information; and determining, according to the cell common time delay information, an uplink timing advance of an uplink transmission timing position with respect to a configuration message receiving position.

In one embodiment, determining, according to the cell common time delay information, the uplink timing advance of the uplink transmission timing position with respect to the configuration message receiving position, includes: estimating a relative transmission time delay corresponding to a propagation distance difference between a user link propagation path of the terminal and a minimum link time delay path of a reference terminal at a preset position to a satellite; determining a cell-specific timing advance of the deviation between a cell common time delay from broadcast signaling and integral multiple time slots according to the cell common time delay information; and determining the uplink timing advance according to the relative transmission time delay and the cell-specific timing advance.

In one embodiment, the reference terminal includes: a terrestrial reference terminal located closest to the satellite or a non-terrestrial reference terminal at a set altitude to the satellite.

In one embodiment, the reference terminal includes a non-terrestrial reference terminal highest from the ground.

In one embodiment, estimating the relative transmission time delay corresponding to the propagation distance difference between the user link propagation path of the terminal and the minimum link time delay path of the reference terminal at the preset position to the satellite, includes: determining positioning information of the terminal according to a global navigation satellite system (GNSS) signal, and acquiring operation parameter information of the satellite through an ephemeris; estimating the propagation distance difference between the user link propagation path of the terminal and the minimum link time delay path of the reference terminal at the preset position to the satellite according to the positioning information and the operation parameter information of the satellite; and determining the relative transmission time delay corresponding to the propagation distance difference.

In one embodiment, determining the uplink timing advance according to the relative transmission time delay and the cell-specific timing advance, includes: summing twice the relative transmission time delay with the cell-specific timing advance to obtain the uplink timing advance.

In one embodiment, the method further includes: receiving an RAR message by the terminal and acquiring a current uplink timing advance adjustment amount in the RAR message; and adjusting the uplink timing advance of the uplink transmission timing position with respect to the configuration message receiving position according to the current uplink timing advance adjustment amount.

In one embodiment, when a subcarrier spacing of a PUSCH is 120 KHz, the uplink timing advance adjustment amount occupies an instruction of 16 bits.

In one embodiment, the method further includes: updating the current uplink timing advance by periodically or non-periodically measuring a downlink beam specific reference signal (BRS) pilot.

In one embodiment, updating the current uplink timing advance by periodically or non-periodically measuring the downlink BRS pilot, includes: determining a moving speed of the satellite and a moving speed of the terminal by periodically or non-periodically measuring the downlink BRS pilot; determining an adjusting step length of the current uplink timing advance according to the moving speed of the satellite, the moving speed of the terminal and a working frequency band of the satellite; and updating the current uplink timing advance according to the adjusting step length.

In one embodiment, determining the adjusting step length of the current uplink timing advance according to the moving speed of the satellite, the moving speed of the terminal and the working frequency band of the satellite, includes: determining the length of a cyclic prefix (CP) in the received configuration message according to the working frequency band of the satellite; determining an adjusting coefficient corresponding to a speed range in which a sum value of the satellite speed and the terminal speed is located; and determining the adjusting step length of the current uplink timing advance according to the determined length of the CP and the adjusting coefficient.

In one embodiment, the current uplink timing advance is updated according to the adjusting step length according to the following formula:

$$N_{TA,new} = N_{TA,old} + (T_A - 1024) \times 2 + N_{delta-TA,UE}.$$

$T_A$ is the uplink timing advance adjustment amount in the RAR message and $N_{delta-TA,UE}$ is the adjustment step length.

In one embodiment, the adjusting step length of the current uplink timing advance is determined according to the determined length of the CP and the adjusting coefficient according to the following formula:

$$N_{delta-TA,UE} = 1/M * N_{CP}.$$

$1/M$ is the adjusting coefficient, M is a positive integer greater than or equal to 1, and $N_{CP}$ is the determined length of the CP.

In one embodiment of the present application provides a method for determining a timing advance by a network side device. The method includes: determining cell common time delay information; and transmitting a configuration message carrying relevant parameters to a terminal, where the relevant parameters include the cell common time delay information, and the cell common time delay information is configured for the terminal to determine an uplink timing advance of an uplink transmission timing position with respect to a configuration message receiving position.

In one embodiment, the method further includes: after detecting a PRACH Preamble sent by the terminal, determining an uplink timing advance adjustment amount and transmitting the uplink timing advance adjustment amount to the terminal through an RAR message.

In one embodiment, when a subcarrier spacing of a PUSCH is 120 KHz, the uplink timing advance adjustment amount occupies an instruction of 16 bits.

In one embodiment, determining the uplink timing advance adjustment amount, includes: selecting a time synchronization time slot number corresponding to the terminal according to a detection position at which the PRACH Preamble sent by the terminal is detected and the cell common time delay information; and determining a current uplink timing advance adjustment amount according to the time synchronization time slot number.

In one embodiment of the present application provides a terminal, including: a processor, a memory and a transceiver. The transceiver is configured to receive and send data under the control of the processor; the memory is configured to store computer instructions; and the processor is configured to read the computer instructions in the memory and perform any method in the above embodiments.

In one embodiment of the present application provides a network side device, including: a processor, a memory and a transceiver. The transceiver is configured to receive and send data under the control of the processor; the memory is configured to store computer instructions; and the processor is configured to read the computer instructions in the memory and perform any method in the above embodiments.

In one embodiment of the present application provides a computer storage medium having computer executable instructions stored thereon, and when the executable instructions are executed by a processor, any scheme in the above embodiments are implemented.

In one embodiment of the present application provides a computer storage medium having computer executable instructions stored thereon, and when the executable instructions are executed by a processor, any scheme in the above embodiments are implemented.

The embodiments of the present application provide the method and device for determining the timing advance adjustment amount, mainly aiming at an establishment mechanism of the timing advance adjustment amount in a random access process of an NTN system. In the random access process, the terminal determines the timing position of the uplink transmission PRACH Preamble according to the cell common time delay information in the received configuration message, and determines the value of the timing advance $N_{TA}$ in the above formula according to the cell common time delay information, to determine a starting transmission moment of the uplink transmission PRACH Preamble in the random access process of the NTN system.

BRIEF DESCRIPTION OF THE DRAWINGS

In order to illustrate the embodiments of the present application, the drawings used in the description of the embodiments are briefly described below, and the drawings in the description below are some embodiments of the present application.

DETAILED DESCRIPTION OF THE EMBODIMENTS

Figure 1:
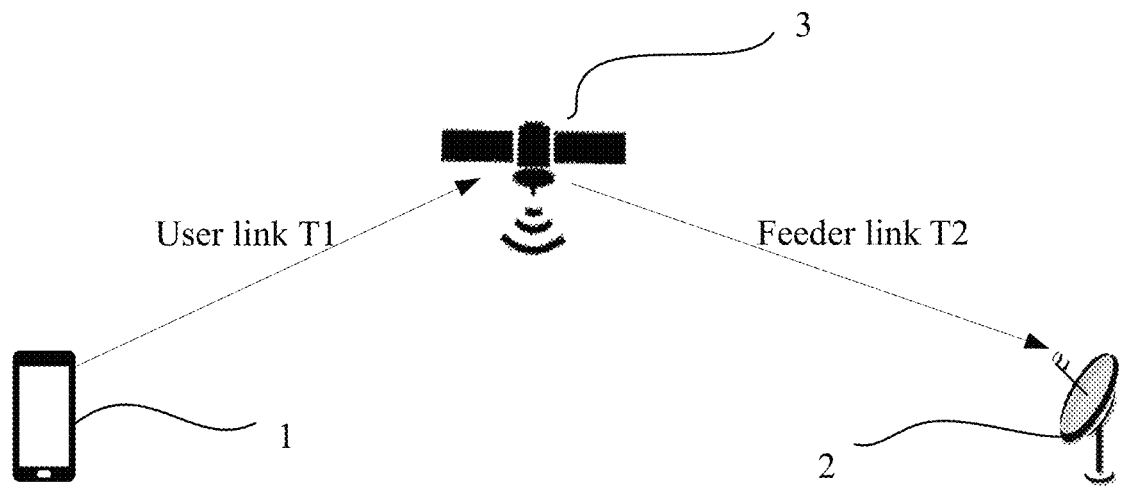
FIG. 1 is a schematic diagram of a common transmission time delay of an NTN system according to an embodiment of the present application.

In the following, some terms in the embodiments of the present application are explained.

The term "and/or" in the embodiments of the present application describes the relationship of associated objects, indicating that there may be three relationships, for example, A and/or B, which may indicate: there are three cases of A alone, A and B simultaneously, and B alone. The character "/" generally indicates that the context associated objects are in an "or" relationship.

According to the embodiments of the present application, a terminal is a device with a wireless communication function, may be deployed on land, including indoor or outdoor, handheld or vehicle-mounted devices, may also be deployed on the water surface (such as ships), and may also be deployed in the air (such as airplanes, balloons and satellites). The terminal may be a mobile phone, a pad, a computer with a wireless transceiving function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation security, a wireless terminal in a smart city, a wireless terminal in a smart home, etc., and may also be various forms of user equipment (UE), mobile stations (MS), and terminal devices.

A network side device, which may be a gateway station, is a device that provides a wireless communication function for the terminal, including but not limited to: a base station, a gNB in 5G, a radio network controller (RNC), a node B (NB), a base station controller (BSC), a base transceiver station (BTS), and a home base station (e.g., home evolved node B, or home node B, HNB), a baseband unit (BBU), a transmitting and receiving point (TRP), a transmitting point (TP), a mobile switching center, etc. The gateway station of the present application may also be a device that provides a wireless communication function for the terminal in other communication systems that may occur in the future.

Embodiments of the present application will be described in further detail below with reference to the accompanying drawings, apparently, the described embodiments are merely some, but not all embodiments of this application.

According to an establishment mechanism of a timing advance adjustment amount of an NR, a transmission timing position of a UE side PRACH sequence is determined, an NR physical layer protocol TS38.211 gives the relationship between uplink and downlink frame timing and uplink transmission timing of a UE side PRACH, and a protocol 36.213 gives uplink transmission timing of a UE side physical uplink shared channel (PUSCH), a physical uplink control channel (PUCCH) and a channel sounding reference signal (SRS).

The basic concept of the parameters used in the embodiments of the present application is given below.

1) Tc and Ts: the parameter Tc is a basic unit in the NR protocol;

$$T_c = 1/(\Delta f_{max} \cdot N_f) \text{Hz}, \Delta f_{max} = 480 \times 10^3 \text{ Hz}, N_f = 4096, k = T_s/T_c = 64, \text{ and}$$

$$T_s = \frac{1}{\Delta f_{ref} \cdot N_{f,ref}},$$

$\Delta f_{ref} = 15 \times 10^3$, $N_{f,ref} = 2048$ are defined.

2) Uplink timing point: an uplink transmission signal time point.

3) Downlink timing point: a standard position of a current subframe in a frame structure when it is assumed that the current subframe is a downlink subframe.

4) Uplink timing advance adjustment amount: representing the change amount that the UE needs to perform uplink timing adjustment by taking the current uplink transmission moment as a reference point. In a random access response, the command word includes 11 bits; after random access is completed, the command word includes 6 bits; and the adjusting step length is a multiple of 16 Tc.

5) $N_{TA}$: a timing advance locally maintained by a UE side, representing a difference value of the uplink transmission signal timing with respect to the downlink timing. $N_{TA} > 0$ denotes the timing advance of an uplink transmission signal, and $N_{TA} < 0$ denotes the uplink delayed transmission of the uplink transmission signal.

6) $N_{TA\ offset}$: configured to provide a time spacing for switching from receiving to transmitting to a base station in a TDD duplex mode. $N_{TA\ offset} = 0$ in the scenario that for FR 1FDD frequency band, NR and LTE coexist.

7) $T_{PRACH,Reference}{}^n$: a timing reference position where the uplink subframe starts to send the PRACH on the UE side, where n is a subframe number.

8) $T_{TX,PRACH}{}^n$: a starting transmission moment of a PRACH preamble on the UE side.

Figure 3:
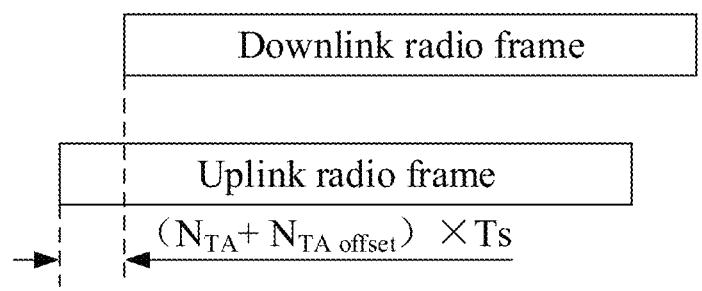
FIG. 3 is a schematic diagram of an uplink and downlink frame timing relationship of an NR system according to an embodiment of the present application.

The relationship of uplink and downlink frame timing of an NR system is as shown in FIG. 3, and an uplink radio frame transmission moment of the UE side is advanced by $(N_{TA} + N_{TA\ offset}) \times Ts$ than a downlink radio frame starting moment of the UE.

For all preamble formats of the NR system, the transmission convention of the PRACH is $N_{TA}=0$, i.e. indicating no reference to the current downlink timing and no timing advance for the uplink transmission timing. The formula is expressed as follows:

$$T_{TX,PRACH}{}^n = T_{PRACH,Reference}{}^n - (N_{TA} + N_{TA\ offset}).$$

Figure 4:
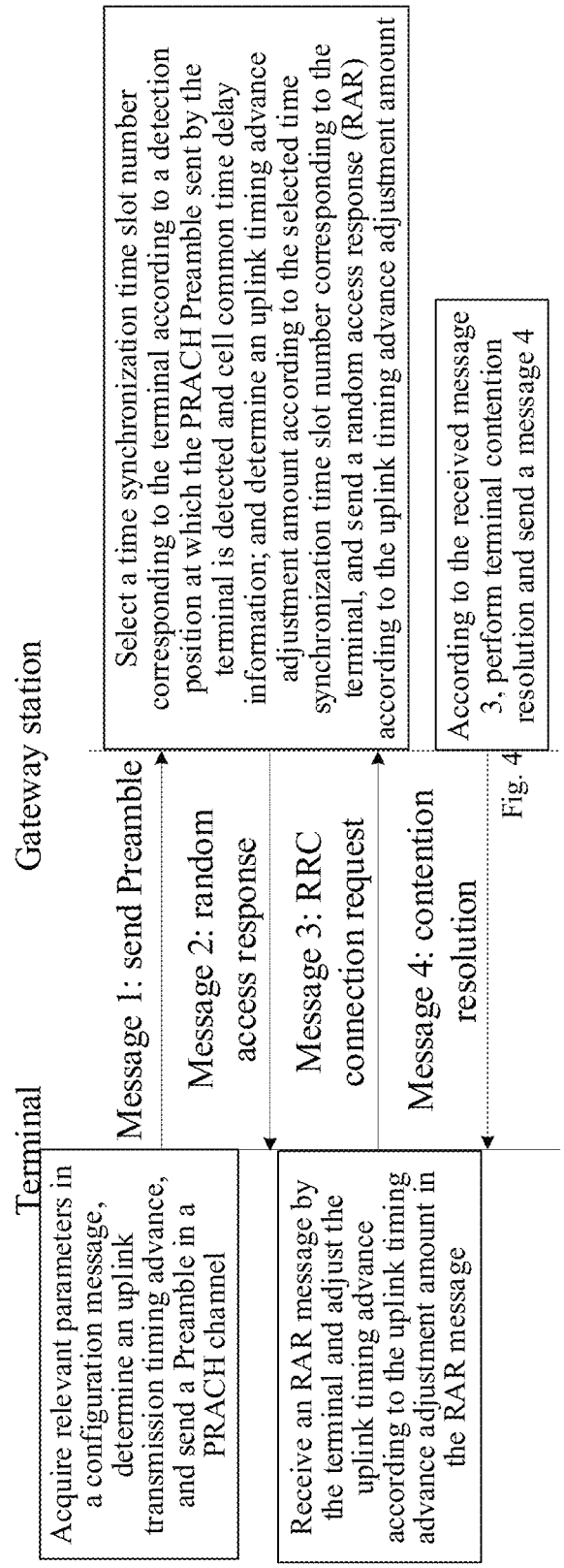
FIG. 4 is a schematic diagram of a random access process of an NTN system according to an embodiment of the present application.

As shown in FIG. 4, a method and device for determining a timing advance adjustment amount provided by the embodiments of the present application mainly aim at the establishment mechanism of the timing advance adjustment amount in the random access process of an NTN system, and illustrate the random access process of an NTN system applied by the embodiments of the present application.

1) A terminal acquires relevant parameters in a configuration message according to the received configuration message sent by a gateway station, determines an uplink transmission timing advance, and sends a Preamble in a PRACH channel.

2) The gateway station selects a time synchronization time slot number corresponding to the terminal according to a detection position at which the PRACH Preamble sent by the terminal is detected and cell common time delay information, determines the uplink timing advance adjustment amount according to the selected time synchronization time slot number corresponding to the terminal, and sends a random access response (RAR) according to the uplink timing advance adjustment amount.

3) The terminal receives an RAR message and adjusts the uplink timing advance according to the uplink timing advance adjustment amount in the RAR message.

4) According to the received message 3, terminal contention resolution is performed and a message 4 is sent.

In the random access process, the terminal determines the timing position of the uplink transmission PRACH Preamble according to the cell common time delay information in the received configuration message, and determines the value of the timing advance $N_{TA}$ in the above formula according to the cell common time delay information, to determine the starting transmission moment of the uplink transmission PRACH Preamble in the random access process of the NTN system.

The establishment mechanism of the timing advance adjustment amount in the random access process of the NTN system provided by the embodiments of the present application is mainly realized by a user side terminal, and in the random access process, the terminal adjusts the uplink transmission moment, which is different from the establishment of a timing advance adjustment amount of an existing NR system in which a downlink receiving timing position is directly adopted as the uplink transmission timing position in the random access process of the new radio NR system. According to the embodiments of the present application, the establishment mechanism is applied to the NTN system, and the uplink timing advance of the uplink transmission timing position with respect to the configuration message receiving position is determined according to the cell common time delay information, so that the uplink transmission timing position is determined according to the uplink timing advance.

Before performing the random access process, the terminal determines the uplink transmission timing position according to the cell common time delay information in the received configuration message to adjust the uplink transmission moment, that is, the PRACH Preamble sequence is sent in advance or in delay, and the moment of transmission in advance or in delay is the determined uplink transmission timing position, the uplink transmission timing position is determined according to the cell common time delay information, so that a mechanism for determining a timing advance applied to the NTN system is established, to guarantee the reliability of the synchronous establishing process of the NTN system and the timing accuracy of subsequent data transmission.

Figure 5:
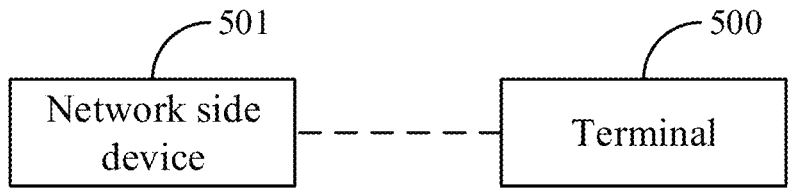
FIG. 5 is a schematic diagram of a system for determining a timing advance according to an embodiment of the present application.

As shown in FIG. 5, a system for determining a timing advance according to the embodiments of the present application includes a terminal 500 and a network side device 501.

A terminal 500 is configured to receive and acquire relevant parameters in a configuration message, where the relevant parameters include cell common time delay information, and determine an uplink timing advance of an uplink transmission timing position with respect to a configuration message receiving position according to the cell common time delay information.

A network side device 501 is configured to determine the cell common time delay information, and send the configuration message carrying the relevant parameters to the terminal, where the relevant parameters include the cell common time delay information.

In the random access process between the terminal and the network side device in the above system, the establishment process of the timing advance is as follows.

Before the random access process is performed and after the network side device determines the cell common time delay information, the configuration message carrying the relevant parameters is sent to the terminal through a system information block (SIB) message (SIB1).

The relevant parameters include parameters of the cell common time delay information, a set of synchronization signal block (SSB) indexes, PRACH time-frequency resources, PRACH Preamble formats and a PRACH Preamble sequence set.

The cell common time delay information in the embodiment of the present application is a random access synchronization time delay existing when the NTN system covers a specific downlink beam area of a cell, and the cell common time delay information is a common transmission time delay of a beam area where a terminal is located, which is obtained by the network side device according to a system broadcast message. The terminal may be located either on the ground or in the high air.

The method for determining the cell common time delay information includes: the network side device acquires the cell common time delay from broadcast signaling according to a minimum link time delay T1 generated by communication between a satellite and the terminal at the closest geographical position to the satellite and a feeder link time delay T2 generated between the satellite and the network side device in the same beam of the satellite, where the cell common time delay is 2 (T1+T2). The minimum link time delay T1 corresponds to a user link T1 in FIG. 1 and the feeder link time delay T2 corresponds to a feeder link T2 in FIG. 1. The network side device in FIG. 1 is a gateway station, but the network side device in FIG. 1 is only one specific embodiment, and the network side device in the embodiments of the present application includes a gateway station, a base station, but is not limited to a gateway station and a base station.

The terminal receives and acquires the cell common time delay information in the configuration message, and determines the uplink timing advance of the uplink transmission timing position with respect to the configuration message receiving position according to the cell common time delay information.

The terminal receives the configuration message sent by the network side device through the SIB1, and the relevant parameters in the acquired configuration message include: the parameters of the cell common time delay information, the set of synchronization signal block (SSB) indexes, the PRACH time-frequency resources, the PRACH Preamble formats and the PRACH Preamble sequence set.

According to the embodiments of the present application, the uplink transmission timing position is determined based on two types of random access synchronization time delays when the NTN system covers the specific downlink beam area of the cell. One type of random access synchronization time delay is a common transmission time delay, the terminal determines the common transmission time delay existing when the NTN system covers the specific downlink beam area of the cell by receiving the cell common time delay information, and as shown in FIG. 1, the common transmission time delay is (T1+T2); another type of random access synchronization time delay is a relative transmission time delay, and a time delay corresponding to a propagation distance difference between a user link propagation path of the terminal and a minimum link time delay path of a reference terminal at the preset geographic position to the satellite in the same coverage cell is the relative transmission time delay, where when the reference terminal is a terrestrial reference terminal closest to the satellite, the propagation distance difference corresponds to d3 in FIG. 2, and when the reference terminal is a non-terrestrial reference terminal at a set altitude to the satellite, the propagation distance difference corresponds to d3 in FIG. 8.

The method for determining the uplink timing advance of the uplink transmission timing position with respect to the configuration message receiving position according to the cell common time delay information includes the following operations.

1) The relative transmission time delay corresponding to the propagation distance difference between the user link propagation path of the terminal and the minimum link time delay path of the reference terminal at the preset position to the satellite is estimated.

In one embodiment, the terminal for estimating includes a terrestrial terminal or a non-terrestrial terminal, and the reference terminal includes: a terrestrial reference terminal located closest to the satellite or a non-terrestrial reference terminal at a set altitude to the satellite, where the non-terrestrial reference terminal at the set altitude to the satellite includes a non-terrestrial reference terminal located highest from the ground, and may be, for example, a reference terminal located at 30000 km from the ground.

Figure 2:
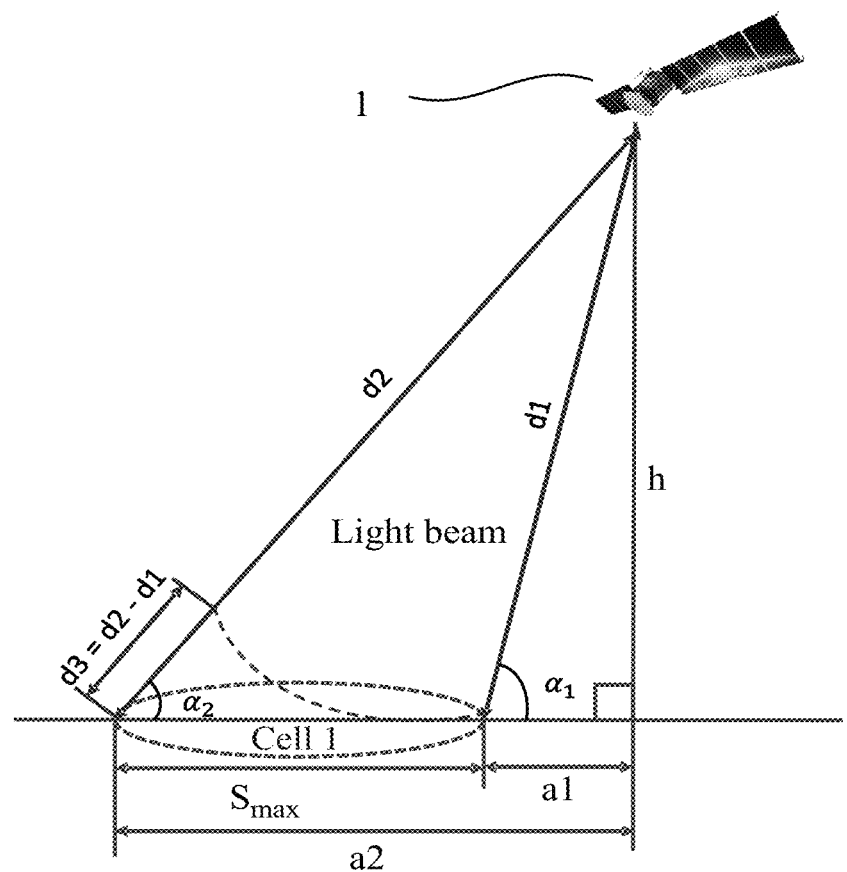
FIG. 2 is a schematic diagram of a relative transmission time delay of an NTN system according to an embodiment of the present application.
Figure 8:
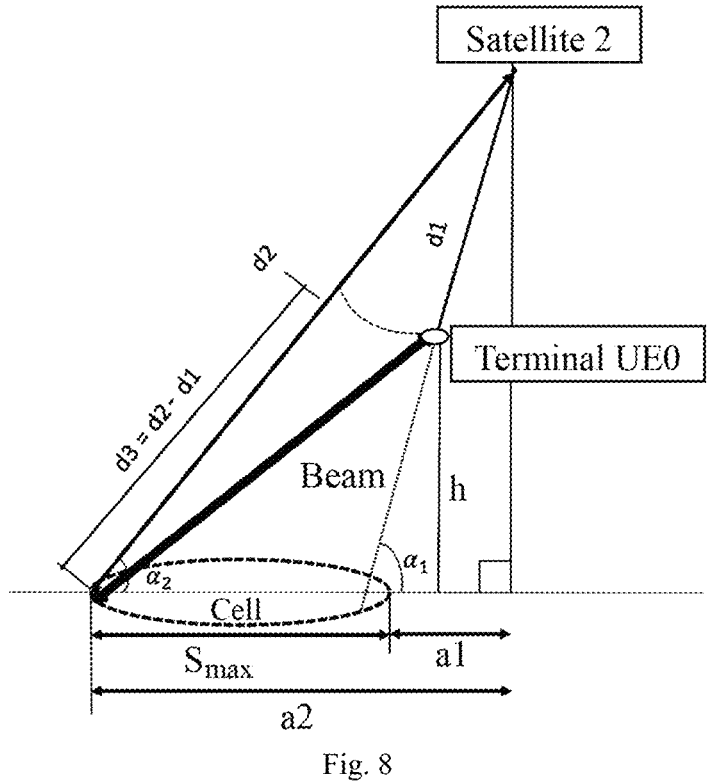
FIG. 8 is a schematic diagram of a reference terminal position for a timing advance according to an embodiment of the present application.

The relative transmission time delay is determined by taking the uplink transmission position of the terminal at a preset position to the satellite as a reference position, when the reference position is an uplink transmission position of the terrestrial reference terminal located closest to the satellite, the obtained relative transmission time delay is d3 in FIG. 2, and when the reference position is an uplink transmission position of the non-terrestrial reference terminal highest from the ground, the obtained relative transmission time delay is d3 in FIG. 8.

2) A cell-specific timing advance of the deviation between the cell common time delay from broadcast signaling and integral multiple time slots is determined according to the cell common time delay information.

3) The uplink timing advance is determined according to the relative transmission time delay and the cell-specific timing advance.

In one embodiment, the terminal determines the uplink transmission timing position according to the following two parts of information: one part is the cell common time delay information in the relevant parameters sent by the network side device, and the other part is the relative transmission time delay estimated by the terminal according to positioning information of the terminal and operation parameters of the satellite, where the terminal is the terrestrial terminal or the non-terrestrial terminal, such as a high-altitude terminal.

Therefore, the terminal determines the timing advance of the uplink transmission timing position with respect to the configuration message receiving position according to the cell common time delay information and the relative transmission time delay. According to the position of the terminal and the position of the reference terminal, the estimated relative transmission time delay is divided into the following four cases.

1) The reference terminal is located on the ground and the terminal is located on the ground, namely the reference terminal is located on the ground closest to the satellite, and the estimated relative transmission time delay is greater than zero.

2) The reference terminal is located on the ground and the terminal is located in the high air, namely the reference terminal is located on the ground closest to the satellite, and the estimated relative transmission time delay is less than zero.

3) The reference terminal is located at the highest position from the ground (such as at the altitude of 30000 km from the ground) and the terminal is located at the ground, and the estimated relative transmission time delay is greater than zero.

4) When the reference terminal is located at the highest position from the ground (such as at the altitude of 30000 km from the ground) and the terminal is located in the high air (below the highest position), the estimated relative transmission time delay is greater than zero.

In view of the fact that the uplink transmission timing position of the terminal is adjusted according to the common transmission time delay and the relative transmission time delay existing in the NTN system in the embodiments of the present application, the reliability of the NTN system in the synchronous establishment process of the random access process and the timing accuracy of the subsequent data transmission are ensured with respect to a timing advance establishment mechanism adopting the NR system.

On the one hand, the terminal determines the timing advance of the uplink transmission timing position with respect to the configuration message receiving position according to the cell common time delay information; and on the other hand, the terminal estimates a relative transmission time delay corresponding to the propagation distance difference between the user link propagation path and a minimum link delay path closest to the satellite according to the positioning information of the terminal. The terminal determines the timing advance according to the relative transmission time delay and the cell-specific timing advance.

In one embodiment, the timing advance is determined according to the following manners.

1) The relative transmission time delay corresponding to the propagation distance difference between the user link propagation path of the terminal and the minimum link time delay path closest to the satellite is estimated.

According to the embodiments of the present application, the terminal determines the positioning information of the terminal according to a global navigation satellite system (GNSS) signal, and acquires operation parameter information of the satellite through an ephemeris; estimates the propagation distance difference between the user link propagation path of the terminal and the minimum link delay path closest to the satellite according to the positioning information and the operation parameter information of the satellite; and determines the relative transmission time delay corresponding to the estimated propagation distance difference.

2) The cell-specific timing advance $T_{offset}$ of the deviation between the cell common time delay from broadcast signaling and the integral multiple time slots is determined according to the cell common time delay information, where the formula is as follows:

$$T_{offset}=2(T1+T2)-\text{floor}(2(T1+T2)/T_{SF})\times T_{SF};$$

2 (T1+T2) represents the cell common time delay information, TSF represents a time length of a time slot, floor(·) represents a downward rounding operation, and the basic unit of $T_{offset}$ is Ts; and $$T_s = \frac{1}{\Delta f_{ref} \cdot N_{f,ref}},$$

$\Delta f_{ref}=15\times 10^3$ Hz, $N_{f,ref}=2048$.

3) The timing advance is determined according to the relative transmission time delay and the cell-specific timing advance.

In one embodiment, twice the relative transmission time delay and the cell-specific timing advance are summed to obtain the timing advance, where the formula is as follows:

$$N_{TA}=2T3+T_{offset};$$

where $N_{TA}$ is the timing advance, and T3 is the relative transmission time delay.

Next, the specific effects of the cell common time delay 2 (T1+T2), the relative transmission time delay T3, and the cell-specific timing advance $T_{offset}$ will be described.

First, a basic principle of establishing a timing advance of the terminal and the network side device of the NTN system is given. A downlink of the terminal takes a received downlink index, including indexes of frames, subframes and time slots, as a current subframe index; when the terminal firstly obtains uplink signal frame synchronization in a random access process, the uplink signal frame synchronization is consistent with the cell common time delay after the relative transmission time delay is supplemented, that is, the uplink transmission timing position with the shortest common distance between the cell and the satellite serves as a reference, the time for all terminals in the cell to reach the network side device serves as the reference with the common distance of the cell, and at the moment, the uplink subframe indexes of all the terminals in one cell are consistent.

Figure 6:
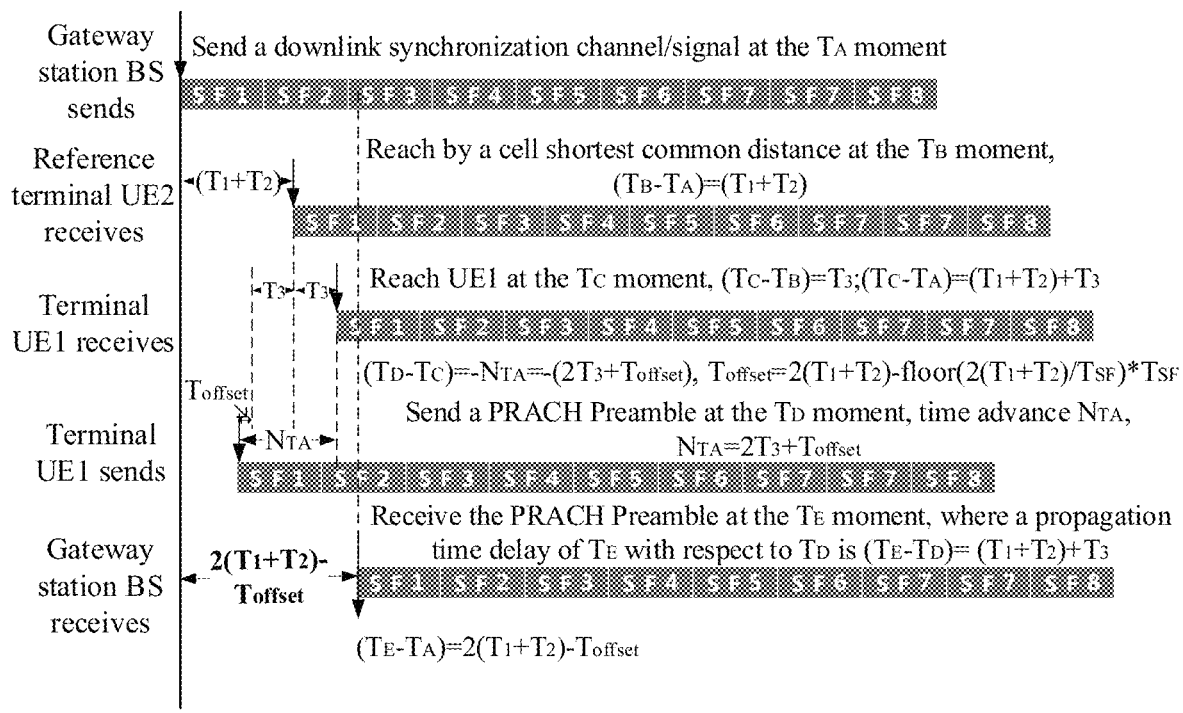
FIG. 6 is a schematic diagram of a process for establishing a timing advance according to an embodiment of the present application.

As shown in FIG. 6, an NTN-based system in the present embodiments includes: a gateway station BS, a terminal UE1 and a reference terminal UE2, where the reference terminal UE2 is located on the ground and is the terminal with the shortest distance from the gateway station BS in the cell, the uplink transmission timing position of the reference terminal UE2 is taken as the reference, and the UE1 is located on the ground and is any UE in the cell. The timing relationship between the UE side and the BS side is as follows.

1) The gateway station sends a downlink synchronization channel/signal at the $T_A$ moment and sends relevant parameters in a configuration message to the terminal.

In one embodiment, the downlink synchronization channel/signal may be an SIB1 message.

2) The reference terminal UE2 closest to the BS in the cell receives the configuration message at the TB moment, and $(T_B-T_A)=(T_1+T_2)$.

That is, the reference terminal UE2 is delayed by $T_1+T_2$ with respect to the $T_A$ moment of transmission by the gateway station, where $T_1$ is a minimum link time delay closest to the satellite, and $T_2$ is a feeder link time delay.

3) The terminal UE1 receives the configuration message at the $T_C$ moment, and $(T_C-T_A)=(T_1+T_2)+T_3$.

According to the above formula, $(T_C-T_A)=(T_1+T_2)+T_3$, i.e. the terminal UE1 is delayed by $T_1+T_2+T_3$ with respect to the $T_A$ moment of transmitting by the gateway station.

4) The terminal UE1 sends a PRACH Preamble at the $T_D$ moment, the time advance with respect to the $T_C$ moment is $N_{TA}$, and the $N_{TA}$ calculation formula is as follows: $N_{TA}=2T_3+T_{offset}$, where $(2T_3+T_{offset})$ is greater than zero, i.e., $N_{TA}>0$.

The time delay of the $T_D$ with respect to the $T_C$ moment is as follows: $(T_D-T_C)=-N_{TA}=-(2T_3+T_{offset})$, indicating that the moment at which the terminal UE1 sends the PRACH Preamble is timing advance transmission with respect to the $T_C$ moment.

5) The gateway station BS detects the PRACH Preamble at the $T_E$ moment, the propagation time delay of the $T_E$ moment with respect to the $T_D$ moment is $(T_E-T_D)=(T_1+T_2)+T_3$, and the propagation time delay of the $T_E$ moment with respect to the $T_A$ moment is $(T_E-T_A)=2(T_1+T_2)-T_{offset}$, where $T_{offset}$ is a cell-specific timing advance and $T_{offset}>0$, and the specific calculation manner is as previously described and will not be repeated herein.

After a base station has detected a PRACH Preamble sequence sent by the terminal, the base station sends a random access response (RAR) message to the terminal.

Meanwhile, a downlink subframe and an uplink subframe of the network side device maintain the same subframe index; and a common offset BTA exists between a reference uplink subframe index and an actually received uplink subframe index of the network side device, such as $B_{TA}=2(T_1+T_2)-T_{offset}$ as shown in the above formula.

Figure 7:
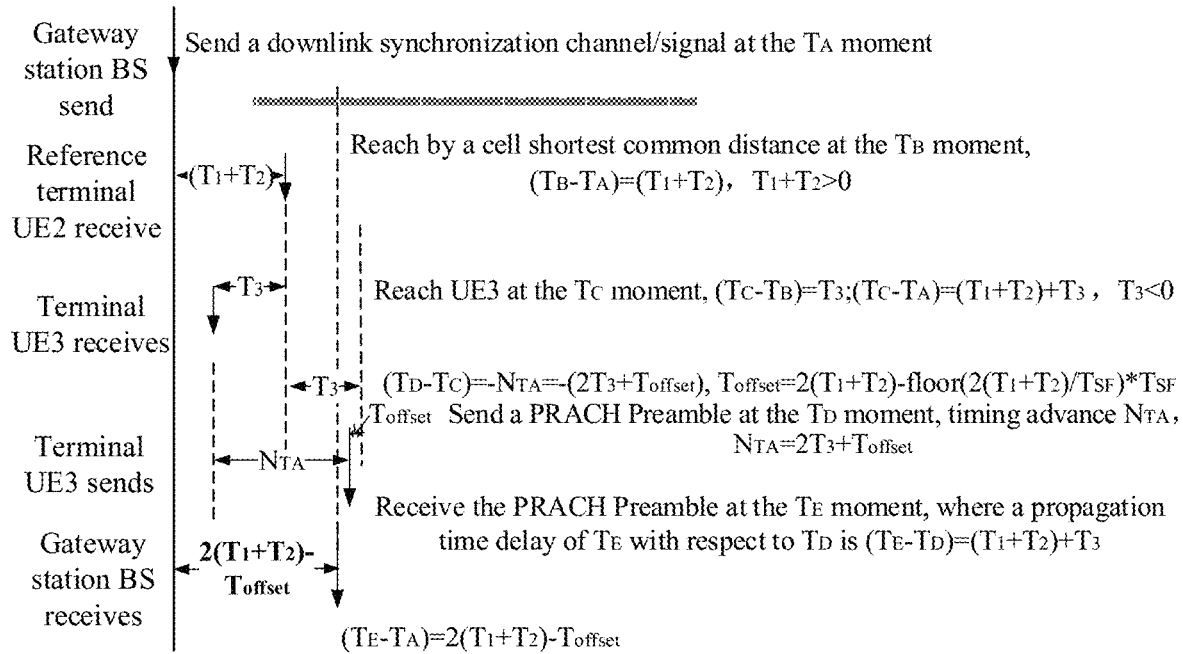
FIG. 7 is a schematic diagram of another process for establishing a timing advance according to an embodiment of the present application.

In addition, as shown in FIG. 7, when the reference terminal UE2 with the shortest distance from the gateway station BS is located on the ground in the above-mentioned NTN system, the uplink transmission timing position of the reference terminal UE2 is taken as a reference and a terminal UE3 is located at any UE in the high air, the timing relationship between the UE side and the BS side is as follows.

1) The gateway station sends a downlink synchronization channel/signal at the $T_A$ moment and sends relevant parameters in a configuration message to the terminal.

2) The reference terminal UE2 closest to the BS in the cell receives the configuration message at the $T_B$ moment, and $(T_B-T_A)=(T_1+T_2)$.

3) The terminal UE3 receives the configuration message at the $T_C$ moment, and the time delay of the $T_C$ time with respect to the $T_B$ moment is: $(T_C-T_B)=T_3$.

Since the terminal UE3 is located in the high air and the distance from the UE3 to the satellite is smaller than the distance from the UE2 to the satellite, $T_3<0$. According to the above formula: $(T_C-T_A)=(T_1+T_2)+T_3$.

4) The terminal UE3 sends a PRACH Preamble at the $T_D$ moment, the time advance with respect to the $T_C$ moment is $N_{TA}$, and the $N_{TA}$ calculation formula is as follows:

$N_{TA}=2T_3+T_{offset}$, where$(2T_3+T_{offset})$ is less than zero, i.e., $N_{TA}<0$.

The time delay of the $T_D$ with respect to the $T_C$ moment is as follows: $(T_D-T_C)=-N_{TA}=-(2T_3+T_{offset})$, indicating that the moment at which the terminal UE3 sends the PRACH Preamble is timing delay transmission with respect to the $T_C$ moment.

5) The gateway station BS detects the PRACH Preamble at the $T_E$ moment, the propagation time delay of the $T_E$ moment with respect to the $T_D$ moment is $(T_E-T_D)=(T_1+T_2)+T_3$, and the propagation time delay of the $T_E$ moment with respect to the $T_A$ moment is $(T_E-T_A)=2(T_1+T_2)-T_{offset}$.

As shown in FIG. 8, a reference terminal UE0 located at a height in the air serves as a reference moment of an uplink transmission timing position, all the terminals include a terrestrial terminal and a non-terrestrial terminal (a high-altitude terminal), the basis reference of the uplink transmission starting moment is the uplink transmission timing position of the terminal UE0, and at the moment, uplink subframe indexes of all the terminals may be kept consistent.

Figure 9:
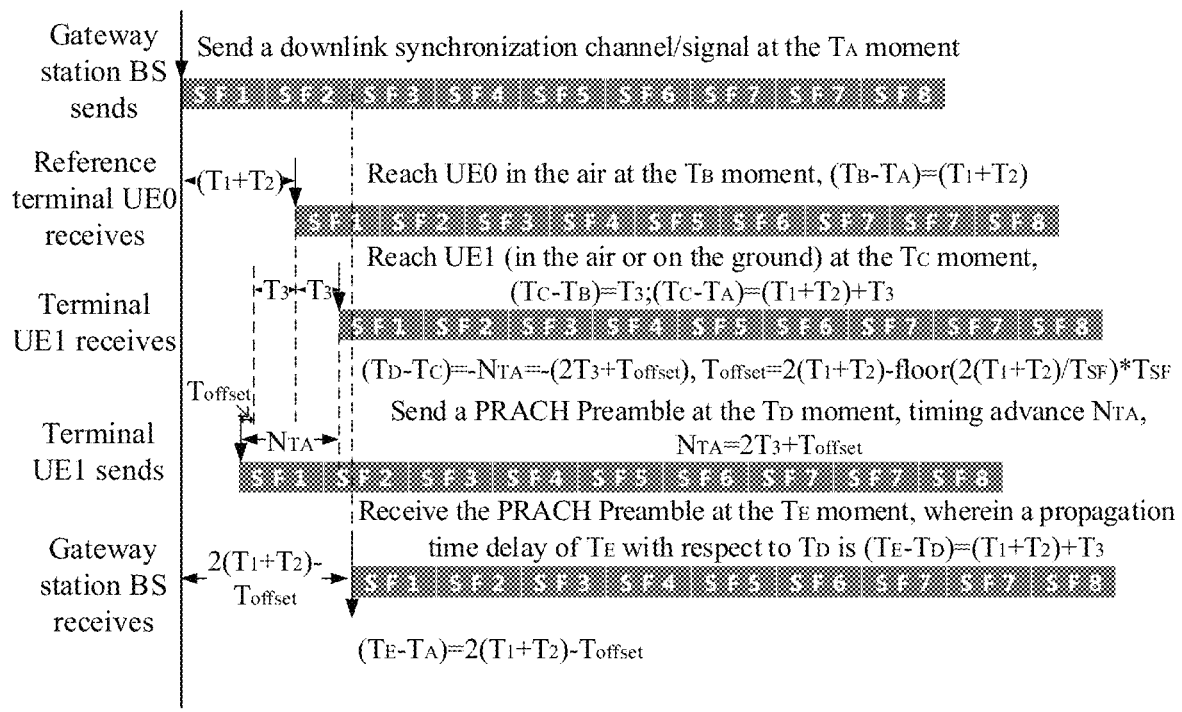
FIG. 9 is a schematic diagram of a last process for establishing a timing advance according to an embodiment of the present application.

As shown in FIG. 9, in the NTN system, when the reference terminal UE0 with the shortest distance from the gateway station BS is located in the air and has the height of 30000 km, and the UE1 is any UE located in the high air or on the ground by taking the uplink transmission timing position of the reference terminal UE0 as the basis, the timing relationship between the UE side and the BS side is as follows.

1) The gateway station sends a downlink synchronization channel/signal at the $T_A$ moment and sends relevant parameters in a configuration message to the terminal.

2) The reference terminal UE0 receives the configuration message at the TB moment, and $(T_B-T_A)=(T_1+T_2)$.

3) The terminal UE1 receives the configuration message at the $T_C$ moment, and $(T_C-T_A)=(T_1+T_2)+T_3$.

According to the above formula, $(T_C-T_A)=(T_1+T_2)+T_3$, i.e. the terminal UE1 is delayed by $T_1+T_2+T_3$ with respect to the $T_A$ moment of transmitting by the gateway station.

4) The terminal UE1 sends a PRACH Preamble at the $T_D$ moment, the time advance with respect to the $T_C$ moment is $N_{TA}$, and the $N_{TA}$ calculation formula is as follows:

$N_{TA}=2T_3+T_{offset}$, where$(2T_3+T_{offset})$ is greater than zero, i.e., $N_{TA}>0$.

The time delay of the $T_D$ with respect to the $T_C$ moment is as follows:

$(T_D-T_C)=-N_{TA}=-(2T_3+T_{offset})$, indicating that the moment at which the terminal UE1 sends the PRACH Preamble is timing advance transmission with respect to the $T_C$ moment.

5) The gateway station BS detects the PRACH Preamble at the $T_E$ moment, the propagation time delay of the $T_E$ moment with respect to the $T_D$ moment is $(T_E-T_D)=(T_1+T_2)+T_3$, and the propagation time delay of the $T_E$ moment with respect to the $T_A$ moment is $(T_E-T_A)=2(T_1+T_2)-T_{offset}$.

After the network side device detects the physical random access channel preamble (PRACH Preamble) sent by the terminal, the uplink timing advance adjustment amount is determined and sent to the terminal through the RAR message.

In one embodiment, the method for determining the uplink timing advance adjustment amount by the network side device includes: a time synchronization time slot number corresponding to the terminal is selected according to the detection position at which the PRACH Preamble sent by the terminal is detected and the cell common time delay information; and a current uplink timing advance adjustment amount $T_A$ is determined according to the selected time synchronization time slot number corresponding to the terminal.

The uplink timing advance adjustment amount occupies an instruction of 16 bits, i.e., $T_A$ may be taken to be 0, 1, 2 . . . , 65535.

On one hand, the terminal receives the RAR message and acquires the uplink timing advance adjustment amount in the RAR message; and adjusts the uplink timing advance of the uplink transmission timing position with respect to the configuration message receiving position according to the uplink timing advance adjustment amount.

The terminal acquires uplink synchronization according to the uplink timing advance adjustment amount, and adjusts the uplink transmission timing position according to the current uplink timing advance adjustment amount according to the following formula.

In one embodiment, SCS=120 KHz of the PUSCH is considered, the uplink timing advance adjustment amount will use the instruction of 16 bits, and $N_{TA}=T_A\times 2Ts$, where the uplink timing advance adjustment amount $T_A$ may be taken to be 0, 1, 2, . . . , 65535.

$$T_s = \frac{1}{\Delta f_{ref} \cdot N_{f,ref}},$$

$\Delta f_{ref}=15\times 10^3 Hz, N_{f,ref}=2048$.

The maximum adjustment value of $N_{TA}$ is 4.267 ms, and Ts=1/30.72e6s.

On the other hand, the terminal updates the current uplink timing advance, and updating mechanisms may be as follows: one updating mechanism is that the terminal updates the current uplink timing advance by periodically or non-periodically measuring a downlink BRS pilot; and the other updating mechanism is that the terminal updates the current uplink timing advance according to the uplink timing advance adjustment amount carried in the received RAR message.

The two updating mechanisms is used alternately or separately.

The mode for updating the uplink timing advance in the existing NR system is as follows.

First, the parameters $N_{TA,old}$ and $N_{TA,new}$ used in the process of updating the uplink timing advance are defined.

$N_{TA,old}$: a current $N_{TA}$ value when the UE does not receive a new uplink timing advance adjustment amount $T_A$.

$N_{TA, new}$: a value when the UE receives the new uplink timing advance adjustment amount $T_A$ and after the current $N_{TA}$ is updated according to the $T_A$.

After receiving the random access response, the UE analyzes the uplink timing advance adjustment amount $T_A$ from the random access response, calculates the uplink timing advance $N_{TA}$, adjusts the uplink transmission timing through the $N_{TA}$ value, and reserves the $N_{TA}$ as an initial value for adjustment in a subsequent uplink synchronization process.

The calculation formula of $N_{TA}$ is $N_{TA}=T_A\times 16$, the granularity is 16 Ts, an uplink timing synchronization command word $T_A$ is of 12 bits, and the $T_A$ is taken as 0, 1, 2, . . . , 4095.

The uplink timing synchronization command word $T_A$ of 12 bits can support the maximum cell radius of 320 km, and meets the design requirement for supporting the cell radius of 150 km to 300 km provided in TR38.913 by the 3GPP.

After the UE completes the random access procedure, the gateway station will periodically send the uplink timing synchronization command word $T_A$ to the UE. After the UE receives the $T_A$, the UE updates the value of $N_{TA,old}$ into $N_{TA, new}$, and then adjusts the uplink transmission timing of the UE by using the $N_{TA, new}$.

The updating formula of $N_{TA, old}$ is:

$$N_{TA,new}=N_{TA,old}+(T_A-31)\times 16;$$

where $T_A$ represents an adjustment amount of a currently used timing advance $N_{TA,old}$ and a new timing advance $N_{TA, new}$, and $T_A$ contains 6 bits and has a value range of $T_A=0, 1, 2, \ldots, 63$.

When $T_A>31$, $N_{TA, new}>N_{TA,old}$, indicating that the transmission signal timing is in advance on the basis of the current timing.

When $T_A<31$, $N_{TA, new}<N_{TA,old}$, indicating that the transmission signal timing is in delay on the basis of the current timing.

When $T_A=31$, $N_{TA, new}=N_{TA,old}$, indicating that the transmission signal timing keeps unchanged on the basis of the current timing.

In the embodiments of the present application, based on the NTN system, since the satellite moves at a speed of about 8 km/s per second at an orbital height of 1175 km from the surface, considering that the maximum distance between the satellite and the terminal is about 3090 km, the maximum distance between the satellite and the network side device such as the gateway station is 3531 km, and the maximum time delay between the terminal and the gateway station is 22 ms, the path length variation caused by satellite movement is about 300-400 meters, the corresponding path time delay is about 1.32 us, and the length of a cyclic prefix (CP) in the PRACH Preamble sequence exceeding a subcarrier by 120 kHz IS 0.59 us, so the terminal needs to regularly measure the downlink BRS pilot in the transmission process, know the transmission path CHANGE caused by movement through measurement, pre-compensate the transmission advance in advance, and reduce the performance loss of inaccurate synchronization accuracy caused by the movement performance. Compared with a method for increasing the length of the CP, the method for updating the uplink timing advance according to the received uplink timing advance adjustment amount provided by the embodiment of the present application has a higher resource utilization rate.

In one embodiment, the terminal determines a moving speed of the satellite and a moving speed of the terminal by periodically or non-periodically measuring a downlink beam specific reference signal (BRS) pilot; determines an adjusting step length of the current uplink timing advance according to the moving speed of the satellite, the moving speed of the terminal and a working frequency band of the satellite; and updates the current uplink timing advance according to the adjusting step length.

Determining the adjusting step length of the current uplink timing advance according to the moving speed of the satellite, the moving speed of the terminal and the working frequency band of the satellite, includes that: the length of the CP in the received configuration message is determined according to the working frequency band of the satellite; an adjusting coefficient corresponding to a speed range in which a sum value of a satellite speed and a terminal speed is located is determined; and the adjusting step length of the current uplink timing advance is determined according to the determined length of the CP and the adjusting coefficient.

The current uplink timing advance is updated according to the adjusting step length according to the following formula:

$$N_{TA,new}=N_{TA,old}+(T_A-1024)\times 2+N_{delta-TA,UE};$$

where $T_A$ is the uplink timing advance adjustment amount in the RAR message, and $N_{delta-TA,UE}$ is the adjustment step size.

When PUSCH SCS=120 KHz, the uplink timing advance adjustment amount $T_A$ contains 11 bits. $T_A$ contains 11 bits and has a value range of $T_A=0, 1, 2, \ldots, 2047$.

When $T_A>1024$, $N_{TA, new}>N_{TA,old}$, indicating that the transmission signal timing is in advance on the basis of the current timing.

When $T_A<1024$, $N_{TA, new}<N_{TA, old}$, indicating that the transmission signal timing is in delay on the basis of the current timing.

When $T_A=1024$, $N_{TA, new}=N_{TA,old}$, indicating that the transmission signal timing keeps unchanged on the basis of the current timing.

The above-mentioned $N_{delta-TA,UE}$ indicates the adjusting step length of the current uplink timing advance automatically adjusted by the terminal, and the adjusting step length of the current uplink timing advance is determined according to the determined length of the CP and the adjusting coefficient according to the following formula:

$$N_{delta-TA,UE}=1/M*N_{CP};$$

where $1/M$ is the adjusting coefficient, M is a positive integer greater than or equal to 1, and $N_{CP}$ is the determined length of the CP.

In one embodiment, the sum of the satellite speed and the terminal speed may be divided into three levels, high, medium and low, respectively corresponding to different M values, as shown in Table 1.

TABLE 1

| Sum of Satellite Speed and Terminal Speed | M |
|---|---|
| High | 1 |
| Medium | 2 |
| Low | 3 |

In summary, the establishment of the timing advance adjustment amount between the terminal and the network side device in a random access system is completed through the method according to the embodiments of the present application. The downlink of the terminal takes the received downlink frame index, subframe index and time slot index as current subframe indexes; when the terminal firstly obtains the uplink signal frame synchronization in the random access process, the uplink signal frame synchronization is consistent with the cell common time delay after the relative transmission time delay is supplemented, that is, the uplink transmission timing position with the shortest common distance between the cell and the satellite serves as a reference, and the time for all terminals in the cell to reach the network side device serves as the reference with the common distance of the cell. The method provided by the embodiments of the present application can ensure that the uplink subframe indexes of all the terminals in the satellite beam coverage cell keep consistent.

Figure 10:
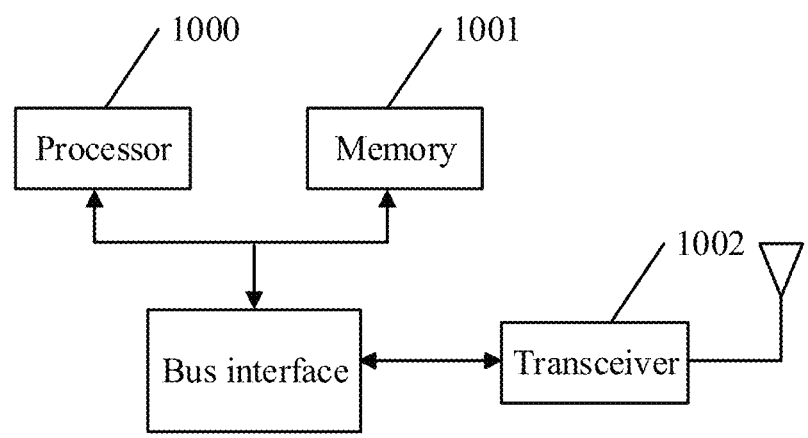
FIG. 10 is a schematic diagram of a first terminal for determining a timing advance according to an embodiment of the present application.

As shown in FIG. 10, a first terminal for determining a timing advance according to the embodiments of the present application includes: a processor 1000, a memory 1001 and a transceiver 1002.

The processor 1000 is responsible for managing a bus architecture and general processing, and the memory 1001 is configured to store data used by the processor 1000 in performing operations. The transceiver 1002 is configured to receive and transmit data under the control of the processor 1000.

The bus architecture may include any number of interconnected buses and bridges, In one embodiment, one or more processors represented by the processor 1000 and various circuits of the memory represented by the memory 1001 are linked together. The bus architecture may also link various other circuits such as peripheral devices, voltage regulators, power management circuits, and the like, which are well known in the art, and therefore, it will not be described further herein. A bus interface provides an interface. The processor 1000 is responsible for managing the bus architecture and general processing, and the memory 1001 may store data used by the processor 1000 in performing operations.

The processes disclosed according to the embodiments of the present application may be implemented in or by the processor 1000. In implementations, the steps of a signal processing flow may be performed by an integrated logic circuit in hardware or instructions in software in the processor 1000. The processor 1000 may be a general processor, a digital signal processor, a specific integrated circuit, a field programmable gate array or other programmable logic device, a discrete gate or transistor logic device, and a discrete hardware component, which may implement or perform the methods, steps, and logic block diagrams disclosed in the embodiments herein. The general processor may be a microprocessor, any conventional processor, etc. The steps of the method disclosed in connection with the embodiments of the present application may be embodied directly in hardware processor execution or in a combination of hardware and software modules in the processor. The software module may be located in a random access memory, flash memory, read only memory, programmable read only memory, or electrically erasable programmable memory, a register, or other storage media as is well known in the art. The storage medium is located in the memory 1001, and the processor 1000 reads the information in the memory 1001 and completes the steps of the signal processing flow in combination with the hardware thereof.

The processor 1000 is configured to read a program in the memory 1001 and execute the following processes: receiving and acquiring relevant parameters in a configuration message, where the relevant parameters include cell common time delay information; and determining, according to the cell common time delay information, an uplink timing advance of an uplink transmission timing position with respect to a configuration message receiving position.

In one embodiment, the processor is In one embodiment configured to: estimate a relative transmission time delay corresponding to a propagation distance difference between a user link propagation path of the terminal and a minimum link time delay path closest to a satellite; determine a cell-specific timing advance of the deviation between a cell common time delay from broadcast signaling and integral multiple time slots according to the cell common time delay information; and determine the uplink timing advance according to the relative transmission time delay and the cell-specific timing advance.

In one embodiment, the processor is In one embodiment configured to: determine positioning information of the terminal according to a global navigation satellite system (GNSS) signal, and acquire operation parameter information of the satellite through an ephemeris; estimate the propagation distance difference between the user link propagation path of the terminal and the minimum link time delay path closest to the satellite according to the positioning information and the operation parameter information of the satellite; and determine the relative transmission time delay corresponding to the estimated propagation distance difference.

In one embodiment, the processor is In one embodiment configured to: sum twice the relative transmission time delay with the cell-specific timing advance to obtain the uplink timing advance.

In one embodiment, the processor is further In one embodiment configured to: receive an RAR message by the terminal and acquire a current uplink timing advance adjustment amount in the RAR message; and adjust the uplink timing advance of the uplink transmission timing position with respect to the configuration message receiving position according to the current uplink timing advance adjustment amount.

In one embodiment, when a subcarrier spacing of a PUSCH is 120 KHz, the uplink timing advance adjustment amount occupies an instruction of 16 bits.

In one embodiment, the processor is further In one embodiment configured to: update the current uplink timing advance by periodically or non-periodically measuring a downlink BRS pilot.

In one embodiment, the processor is In one embodiment configured to: determine a moving speed of the satellite and a moving speed of the terminal by periodically or non-periodically measuring the downlink BRS pilot; determine an adjusting step length of the current uplink timing advance according to the moving speed of the satellite, the moving speed of the terminal and a working frequency band of the satellite; and update the current uplink timing advance according to the adjusting step length.

In one embodiment, the processor is In one embodiment configured to: determine the length of a CP in the received configuration message according to the working frequency band of the satellite; determine an adjusting coefficient corresponding to a speed range in which a sum value of the satellite speed and the terminal speed is located; and determine the adjusting step length of the current uplink timing advance according to the determined length of the CP and the adjusting coefficient.

In one embodiment, the processor is In one embodiment configured to: update the current uplink timing advance according to the adjusting step length according to the following formula:

$$N_{TA,new} = N_{TA,old} + (T_A - 1024) \times 2 + N_{delta\text{-}TA,UE},$$

where $T_A$ is the uplink timing advance adjustment amount in the RAR message and $N_{delta\text{-}TA,UE}$ is the adjustment step length.

In one embodiment, the processor is In one embodiment configured to: determine the adjusting step length of the current uplink timing advance according to the determined length of the CP and the adjusting coefficient according to the following formula:

$$N_{delta\text{-}TA,UE} = 1/M * N_{CP},$$

where $1/M$ is the adjusting coefficient, M is a positive integer greater than or equal to 1, and $N_{CP}$ is the determined length of the CP.

Figure 11:
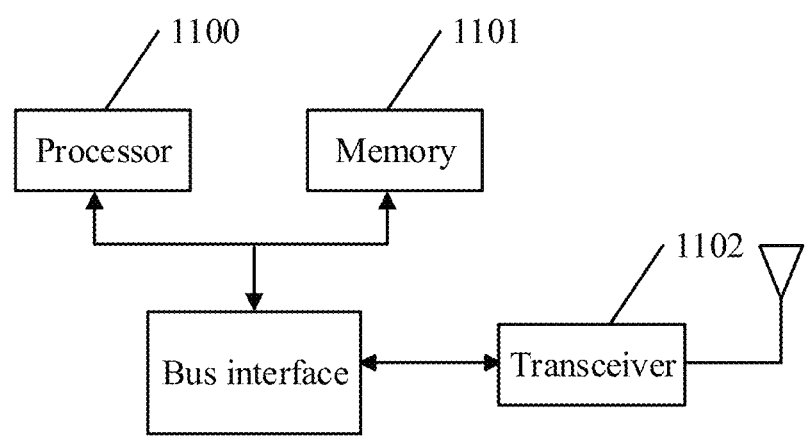
FIG. 11 is a schematic diagram of a first network side device for determining a timing advance according to an embodiment of the present application.

As shown in FIG. 11, a first network side device for determining a timing advance according to the embodiment of the present application includes: a processor 1100, a memory 1101 and a transceiver 1102.

The processor 1100 is responsible for managing a bus architecture and general processing, and the memory 1101 may store data used by the processor 1100 in performing operations. The transceiver 1102 is configured to receive and transmit data under the control of the processor 1100.

The bus architecture may include any number of interconnected buses and bridges, In one embodiment, one or more processors represented by the processor 1100 and various circuits of the memory represented by the memory 1101 are linked together. The bus architecture may also link various other circuits such as peripheral devices, voltage regulators, power management circuits, and the like, which are well known in the art, and therefore, it will not be described further herein. A bus interface provides an interface. The processor 1100 is responsible for managing the bus architecture and general processing, and the memory 1101 may store data used by the processor 1100 in performing operations.

The processes disclosed according to the embodiments of the present application may be implemented in or by the processor 1100. In implementations, the steps of a signal processing flow may be performed by an integrated logic circuit in hardware or instructions in software in the processor 1100. The processor 1100 may be a general processor, a digital signal processor, a specific integrated circuit, a field programmable gate array or other programmable logic device, a discrete gate or transistor logic device, and a discrete hardware component, which may implement or perform the methods, steps, and logic block diagrams disclosed in the embodiments herein. The general processor may be a microprocessor, any conventional processor, etc. The steps of the method disclosed in connection with the embodiments of the present application may be embodied directly in hardware processor execution or in a combination of hardware and software modules in the processor. The software module may be located in a random access memory, flash memory, read only memory, programmable read only memory, or electrically erasable programmable memory, a register, or other storage media as is well known in the art. The storage medium is located in the memory 1101, and the processor 1100 reads the information in the memory 1101 and completes the steps of the signal processing flow in combination with the hardware thereof.

The processor 1100 is configured to read a program in the memory 1101 and execute the following processes: determining cell common time delay information; and transmitting a configuration message carrying relevant parameters to a terminal, where the relevant parameters include the cell common time delay information.

In one embodiment, the processor is In one embodiment configured to: after detecting a PRACH Preamble sent by the terminal, determine an uplink timing advance adjustment amount and send the uplink timing advance adjustment amount to the terminal through an RAR message.

In one embodiment, when a subcarrier spacing of a PUSCH is 120 KHz, the uplink timing advance adjustment amount occupies an instruction of 16 bits.

In one embodiment, the processor is In one embodiment configured to: select a time synchronization time slot number corresponding to the terminal according to a detection position at which the PRACH Preamble sent by the terminal is detected and the cell common time delay information; and determine a current uplink timing advance adjustment amount according to the time synchronization time slot number.

Figure 12:
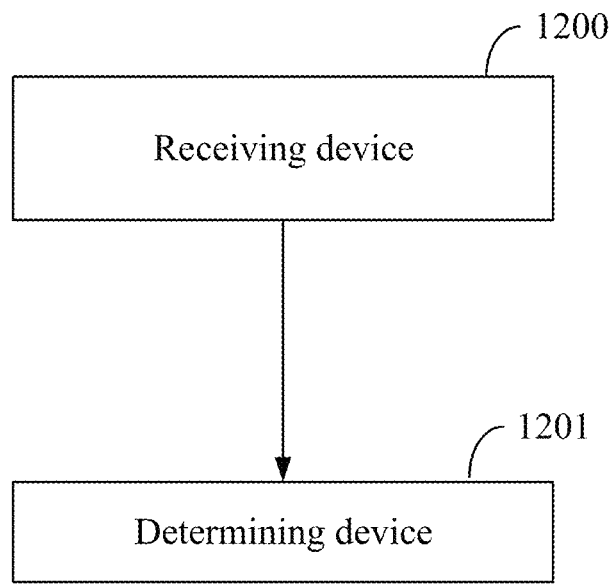
FIG. 12 is a block diagram of a second terminal for determining a timing advance according to an embodiment of the present application.

As shown in FIG. 12, a second terminal for determining a timing advance according to the embodiment of the present application includes: a receiving device 1200, and a determining device 1201.

The receiving device 1200 is configured to receive and acquire relevant parameters in a configuration message, where the relevant parameters include cell common time delay information.

The determining device 1201 is configured to determine, according to the cell common time delay information, an uplink timing advance of an uplink transmission timing position with respect to a configuration message receiving position.

In one embodiment, the determining device 1201 is In one embodiment configured to: estimate a relative transmission time delay corresponding to a propagation distance difference between a user link propagation path of the terminal and a minimum link time delay path closest to a satellite; determine a cell-specific timing advance of the deviation between a cell common time delay from broadcast signaling and integral multiple time slots according to the cell common time delay information; and determine the uplink timing advance according to the relative transmission time delay and the cell-specific timing advance.

In one embodiment, the determining device 1201 is In one embodiment configured to:

determine positioning information of the terminal according to a global navigation satellite system (GNSS) signal, and acquire operation parameter information of the satellite through an ephemeris; estimate the propagation distance difference between the user link propagation path of the terminal and the minimum link time delay path closest to the satellite according to the positioning information and the operation parameter information of the satellite; and determine the relative transmission time delay corresponding to the estimated propagation distance difference.

In one embodiment, the determining device 1201 is In one embodiment configured to: sum twice the relative transmission time delay with the cell-specific timing advance to obtain the uplink timing advance.

In one embodiment, the terminal further includes the receiving device 1200, In one embodiment configured to: receive an RAR message by the terminal and acquire a current uplink timing advance adjustment amount in the RAR message; and adjust the uplink timing advance of the uplink transmission timing position with respect to the configuration message receiving position according to the current uplink timing advance adjustment amount.

In one embodiment, when a subcarrier spacing of a PUSCH is 120 KHz, the uplink timing advance adjustment amount occupies an instruction of 16 bits.

In one embodiment, the terminal further includes an updating device 1202, configured to: update the current uplink timing advance by periodically or non-periodically measuring a downlink BRS pilot.

In one embodiment, the updating device 1202 is In one embodiment configured to: determine a moving speed of the satellite and a moving speed of the terminal by periodically or non-periodically measuring the downlink BRS pilot; determine an adjusting step length of the current uplink timing advance according to the moving speed of the satellite, the moving speed of the terminal and a working frequency band of the satellite; and update the current uplink timing advance according to the adjusting step length.

In one embodiment, the updating device 1202 is In one embodiment configured to: determine the length of a CP in the received configuration message according to the working frequency band of the satellite; determine an adjusting coefficient corresponding to a speed range in which a sum value of the satellite speed and the terminal speed is located; and determine the adjusting step length of the current uplink timing advance according to the determined length of the CP and the adjusting coefficient.

In one embodiment, the updating device 1202 is In one embodiment configured to: update the current uplink timing advance according to the adjusting step length according to the following formula:

$$N_{TA,new}=N_{TA,old}+(T_A-1024)\times 2+N_{delta\text{-}TA,UE}$$

where $T_A$ is the uplink timing advance adjustment amount in the RAR message and $N_{delta\text{-}TA,UE}$ is the adjustment step length.

In one embodiment, the updating device 1202 is In one embodiment configured to: determine the adjusting step length of the current uplink timing advance according to the determined length of the CP and the adjusting coefficient according to the following formula:

$$N_{delta\text{-}TA,UE}=1/M*N_{CP}$$

where 1/M is the adjusting coefficient, M is a positive integer greater than or equal to 1, and $N_{CP}$ is the determined length of the CP.

Figure 13:
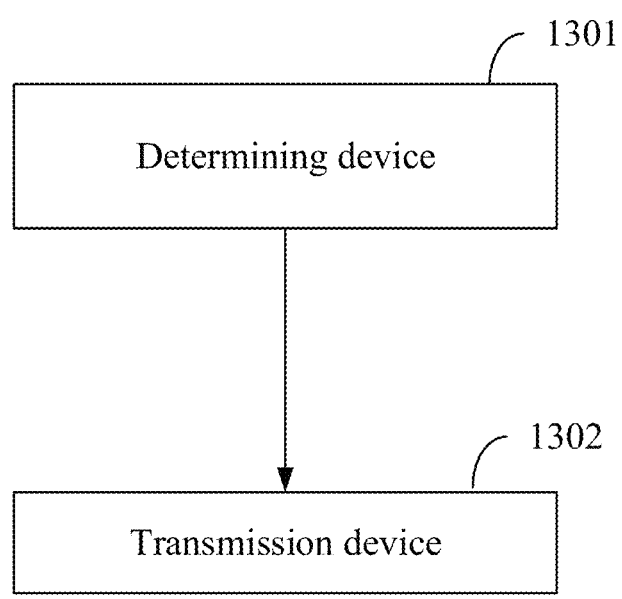
FIG. 13 is a block diagram of a second network side device for determining a timing advance according to an embodiment of the present application.

As shown in FIG. 13, a second network side device for determining a timing advance according to the embodiment of the present application includes a determining device 1301 and a transmission device 1302, where the determining device 1301 is configured to determine cell common time delay information; and the transmission device 1302 is configured to send a configuration message carrying relevant parameters to a terminal, where the relevant parameters include the cell common time delay information.

In one embodiment, the network side device further includes the transmission device 1302, configured to: after detecting a PRACH Preamble sent by the terminal, determine an uplink timing advance adjustment amount and send the uplink timing advance adjustment amount to the terminal through an RAR message.

In one embodiment, when a subcarrier spacing of a PUSCH is 120 KHz, the uplink timing advance adjustment amount occupies an instruction of 16 bits.

In one embodiment, the transmission device 1302 is In one embodiment configured to: select a time synchronization time slot number corresponding to the terminal according to a detection position at which the PRACH Preamble sent by the terminal is detected and the cell common time delay information; and determine a current uplink timing advance adjustment amount according to the time synchronization time slot number.

The embodiment of the present application provides a readable storage medium that is a non-volatile storage medium, the readable storage medium is a non-volatile readable storage medium including a program code, and when the program code runs on a computing device, the program code is configured to enable the computing device to perform the action of the above network side device to determine the timing advance.

The embodiment of the present application provides a readable storage medium that is a non-volatile storage medium, the readable storage medium is a non-volatile readable storage medium including a program code, and when the program code runs on a computing device, the program code is configured to enable the computing device to perform the action of the above terminal to determine the timing advance.

The embodiment of the present application provides a computer program product including instructions, and when the instructions are executed on a computer, a computing device performs the action of the above terminal to determine the timing advance.

The embodiment of the present application provides a computer program product including instructions, and when the instructions are executed on a computer, a computing device performs the action of the above network side device to determine the timing advance.

Based on the same inventive concept, the embodiment of the present application also provides a method for determining a timing advance by a terminal. As the terminal corresponding to the method is the terminal in the embodiments of the present application, and the principle for solving the problem by the method is similar to that of the device, the implementation of the method may be referred to as the implementation of the system, and the repetition is omitted.

Figure 14:
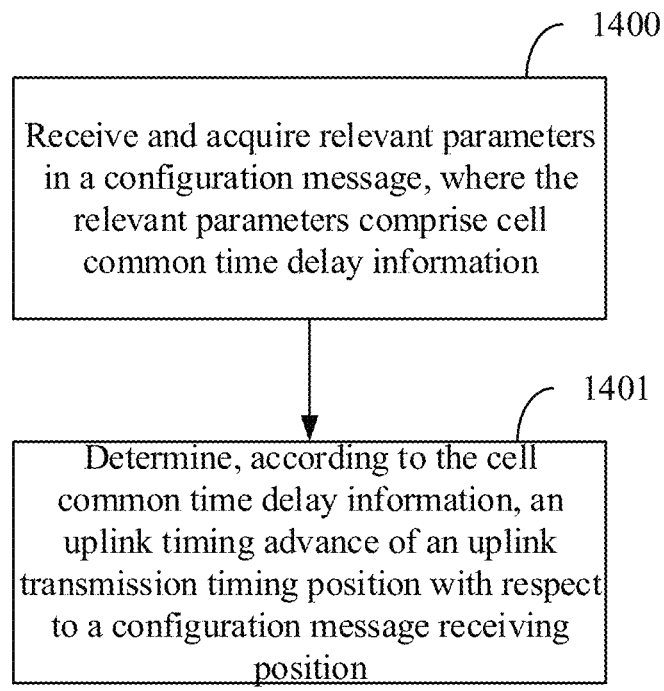
FIG. 14 is a flowchart of a method for determining a timing advance by a terminal according to an embodiment of the present application.

As shown in FIG. 14, the method for determining the timing advance by the terminal according to the embodiment of the present application includes steps 1400 and 1401.

Step 1400: relevant parameters in a configuration message are received and acquired, where the relevant parameters include cell common time delay information.

Step 1401: according to the cell common time delay information, an uplink timing advance of an uplink transmission timing position with respect to a configuration message receiving position is determined.

In one embodiment, determining, according to the cell common time delay information, the uplink timing advance of the uplink transmission timing position with respect to the configuration message receiving position, includes: estimating a relative transmission time delay corresponding to a propagation distance difference between a user link propagation path of the terminal and a minimum link time delay path closest to a satellite; determining a cell-specific timing advance of the deviation between a cell common time delay from broadcast signaling and integral multiple time slots according to the cell common time delay information; and determining the uplink timing advance according to the relative transmission time delay and the cell-specific timing advance.

In one embodiment, estimating the relative transmission time delay includes: determining positioning information of the terminal according to a global navigation satellite system (GNSS) signal, and acquiring operation parameter information of the satellite through an ephemeris; estimating the propagation distance difference between the user link propagation path of the terminal and the minimum link time delay path closest to the satellite according to the positioning information and the operation parameter information of the satellite; and determining the relative transmission time delay corresponding to the estimated propagation distance difference.

In one embodiment, determining the uplink timing advance according to the relative transmission time delay and the cell-specific timing advance, includes: summing twice the relative transmission time delay with the cell-specific timing advance to obtain the uplink timing advance.

In one embodiment, the method further includes: receiving an RAR message by the terminal and acquiring a current uplink timing advance adjustment amount in the RAR message; and adjusting the uplink timing advance of the uplink transmission timing position with respect to the configuration message receiving position according to the current uplink timing advance adjustment amount.

In one embodiment, when a subcarrier spacing of a PUSCH is 120 KHz, the uplink timing advance adjustment amount occupies an instruction of 16 bits.

In one embodiment, the method further includes: updating the current uplink timing advance by periodically or non-periodically measuring a downlink BRS pilot.

In one embodiment, updating the current uplink timing advance by periodically or non-periodically measuring the downlink BRS pilot, includes: determining a moving speed of the satellite and a moving speed of the terminal by periodically or non-periodically measuring the downlink BRS pilot; determining an adjusting step length of the current uplink timing advance according to the moving speed of the satellite, the moving speed of the terminal and a working frequency band of the satellite; and updating the current uplink timing advance according to the adjusting step length.

In one embodiment, determining the adjusting step length of the current uplink timing advance according to the moving speed of the satellite, the moving speed of the terminal and the working frequency band of the satellite, includes: determining the length of a CP in the received configuration message according to the working frequency band of the satellite; determining an adjusting coefficient corresponding to a speed range in which a sum value of the satellite speed and the terminal speed is located; and determining the adjusting step length of the current uplink timing advance according to the determined length of the CP and the adjusting coefficient.

In one embodiment, the current uplink timing advance is updated according to the adjusting step length according to the following formula:

$$N_{TA,new} = N_{TA,old} + (T_A - 1024) \times 2 + N_{delta-TA,UE}$$

where $T_A$ is the uplink timing advance adjustment amount in the RAR message and $N_{delta-TA,UE}$ is the adjustment step length.

In one embodiment, the adjusting step length of the current uplink timing advance is determined according to the determined length of the CP and the adjusting coefficient according to the following formula:

$$N_{delta-TA,UE} = 1/M \ast N_{CP}$$

where 1/M is the adjusting coefficient, M is a positive integer greater than or equal to 1, and $N_{CP}$ is the determined length of the CP.

Based on the same inventive concept, the embodiment of the present application also provides a method for determining a timing advance by a network side device. As the network side device corresponding to the method is the network side device in the embodiments of the present application, and the principle for solving the problem by the method is similar to that of the device, the implementation of the method may be referred to as the implementation of the system, and the repetition is omitted.

Figure 15:
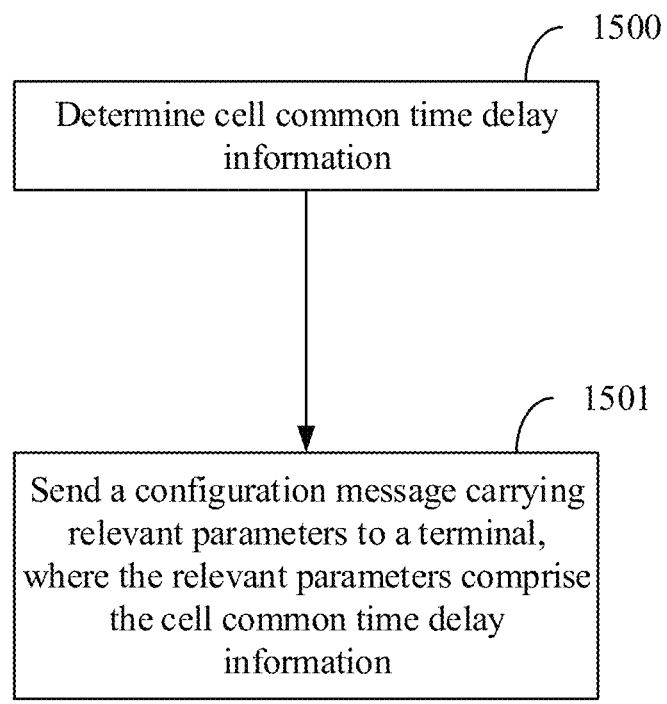
FIG. 15 is a flowchart of a method for determining a timing advance by a network side device according to an embodiment of the present application.

As shown in FIG. 15, a method for determining a timing advance by a network side device includes: step 1500 and step 1501.

Step 1500: cell common time delay information is determined.

Step 1501: a configuration message carrying relevant parameters is sent to a terminal, where the relevant parameters include the cell common time delay information.

In one embodiment, the method further includes: after detecting a PRACH Preamble sent by the terminal, determining an uplink timing advance adjustment amount and transmitting the uplink timing advance adjustment amount to the terminal through an RAR message.

In one embodiment, when a subcarrier spacing of a PUSCH is 120 KHz, the uplink timing advance adjustment amount occupies an instruction of 16 bits.

In one embodiment, determining the uplink timing advance adjustment amount, includes: selecting a time synchronization time slot number corresponding to the terminal according to a detection position at which the PRACH Preamble sent by the terminal is detected and the cell common time delay information; and determining a current uplink timing advance adjustment amount according to the time synchronization time slot number.

The present application has been described above with reference to block diagrams and/or flow diagrams illustrating methods, devices (systems) and/or computer program products according to the embodiments of the present application. It will be understood that one block of the block diagrams and/or flow diagrams, and combinations of blocks in the block diagrams and/or flow diagrams, can be implemented by computer program instructions. These computer program instructions may be provided to a processor of a general-purpose computer, special-purpose computer, and/or other programmable data processing devices to produce a machine, and the instructions, which execute via the computer processor and/or other programmable data processing devices, create the method for implementing the functions/acts specified in the blocks in the block diagrams and/or flow diagrams.

Accordingly, the present application may also be implemented in hardware and/or software (including firmware, resident software, microcode, etc.). Further, the application may take the form of a computer program product usable on a computer or computer-readable storage medium having a computer-usable or computer-readable program code embodied in the medium for use by or in connection with an instruction execution system. In the context of this application, the computer-usable or computer-readable medium can be any medium that may contain, store, communicate, transmit, or transport the program for use by or in connection with the instruction execution system, device, or equipment.

What is claimed is:

1. A method for determining a timing advance by a terminal, comprising:
   receiving and acquiring relevant parameters in a configuration message, wherein the relevant parameters comprise cell common time delay information;
   estimating a relative transmission time delay corresponding to a propagation distance difference between a user link propagation path of the terminal and a minimum link time delay path of a reference terminal at a preset position to a satellite;
   determining a cell-specific timing advance of deviation between a cell common time delay from broadcast signaling and integral multiple time slots according to the cell common time delay information; and
   determining, according to the relative transmission time delay and the cell-specific timing advance, an uplink timing advance of an uplink transmission timing position with respect to a configuration message receiving position.

2. The method according to claim 1, wherein the reference terminal comprises: a terrestrial reference terminal located closest to a satellite or a non-terrestrial reference terminal at a set altitude to the satellite.

3. The method according to claim 2, wherein the non-terrestrial reference terminal at the set altitude to the satellite comprises: a non-terrestrial reference terminal highest from the ground.

4. The method according to claim 1, wherein the estimating the relative transmission time delay corresponding to the propagation distance difference between the user link propagation path of the terminal and the minimum link time delay path of the reference terminal at the preset position to the satellite, comprises:
   determining positioning information of the terminal according to a global navigation satellite system (GNSS) signal, and acquiring operation parameter information of the satellite through an ephemeris;
   estimating the propagation distance difference between the user link propagation path of the terminal and the minimum link time delay path of the reference terminal at the preset position to the satellite according to the positioning information and the operation parameter information of the satellite; and
   determining the relative transmission time delay corresponding to the propagation distance difference.

5. The method according to claim 1, wherein the determining the uplink timing advance according to the relative transmission time delay and the cell-specific timing advance, comprises:
   obtaining the uplink timing advance by summing twice the relative transmission time delay with the cell-specific timing advance.

6. The method according to claim 1, further comprising:
   receiving a random access response (RAR) message and acquiring a current uplink timing advance adjustment amount in the RAR message; and
   adjusting the uplink timing advance of the uplink transmission timing position with respect to the configuration message receiving position according to the current uplink timing advance adjustment amount.

7. The method according to claim 6, wherein when a subcarrier spacing (SCS) of a physical uplink shared channel (PUSCH) is 120 KHz, the uplink timing advance adjustment amount occupies an instruction of 16 bits.

8. The method according to claim 1, further comprising:
   receiving an RAR message and acquiring a current uplink timing advance adjustment amount in the RAR message; and
   updating the current uplink timing advance by periodically or non-periodically measuring a downlink beam-specific reference signal (BRS) pilot.

9. The method according to claim 8, wherein the updating the current uplink timing advance by periodically or non-periodically measuring the downlink BRS pilot, comprises:
   determining a moving speed of a satellite and a moving speed of the terminal by periodically or non-periodically measuring the downlink BRS pilot;
   determining an adjusting step length of the current uplink timing advance according to the moving speed of the satellite, the moving speed of the terminal and a working frequency band of the satellite; and
   updating the current uplink timing advance according to the adjusting step length.

10. The method according to claim 9, wherein the current uplink timing advance is updated according to the adjusting step length by the following formula:

$$N_{TA,new}=N_{TA,old}+(T_A-1024)\times 2+N_{delta\text{-}TA,UE}.$$

wherein $T_A$ is the uplink timing advance adjustment amount in the RAR message and $N_{delta\text{-}TA,UE}$ is the adjustment step length.

11. The method according to claim 9, wherein the determining the adjusting step length of the current uplink timing advance according to the moving speed of the satellite, the moving speed of the terminal and the working frequency band of the satellite, comprises:
   determining a length of a cyclic prefix (CP) in the received configuration message according to the working frequency band of the satellite;
   determining an adjusting coefficient corresponding to a speed range in which a sum value of the moving speed of the satellite and the moving speed of the terminal is located; and
   determining the adjusting step length of the current uplink timing advance according to the length of the CP and the adjusting coefficient.

12. The method according to claim 11, wherein the adjusting step length of the current uplink timing advance is determined according to the length of the CP and the adjusting coefficient by the following formula:

$$N_{delta\text{-}TA,UE}=1/M*NCP$$

wherein 1/M is the adjusting coefficient, M is a positive integer greater than or equal to 1, and $N_{CP}$ is the length of the CP.

13. A method for determining a timing advance by a network side device, comprising:
   determining cell common time delay information; and
   transmitting a configuration message carrying relevant parameters to a terminal, wherein the relevant parameters comprise the cell common time delay information, and the cell common time delay information is configured for the terminal to determine an uplink timing advance of an uplink transmission timing position with respect to a configuration message receiving position according to the cell common time delay information by the following operations:
   estimating a relative transmission time delay corresponding to a propagation distance difference between a user link propagation path of the terminal and a minimum link time delay path of a reference terminal at a preset position to a satellite;
   determining a cell-specific timing advance of deviation between a cell common time delay from broadcast signaling and integral multiple time slots according to the cell common time delay information; and
   determining, according to the relative transmission time delay and the cell-specific timing advance, the uplink timing advance of the uplink transmission timing position with respect to the configuration message receiving position.

14. The method according to claim 13, further comprising:
   after detecting a physical random access channel (PRACH) Preamble sent by the terminal, determining an uplink timing advance adjustment amount and transmitting the uplink timing advance adjustment amount to the terminal through an RAR message.

15. The method according to claim 14, wherein when an SCS of a PUSCH is 120 KHz, the uplink timing advance adjustment amount occupies an instruction of 16 bits.

16. The method according to claim 14, wherein the determining the uplink timing advance adjustment amount, comprises:

selecting a time synchronization time slot number corresponding to the terminal according to a detection position at which the PRACH Preamble sent by the terminal is detected and the cell common time delay information; and determining a current uplink timing advance adjustment amount according to the time synchronization time slot number.

17. A terminal, comprising: a processor, a memory and a transceiver, wherein the transceiver is configured to receive and send data under control of the processor;

the memory is configured to store computer instructions; and the processor is configured to read the computer instructions in the memory and perform the following process:

receiving and acquiring relevant parameters in a configuration message, wherein the relevant parameters comprise cell common time delay information;

estimating a relative transmission time delay corresponding to a propagation distance difference between a user link propagation path of the terminal and a minimum link time delay path of a reference terminal at a preset position to a satellite;

determining a cell-specific timing advance of deviation between a cell common time delay from broadcast signaling and integral multiple time slots according to the cell common time delay information; and determining, according to the relative transmission time delay and the cell-specific timing advance, an uplink timing advance of an uplink transmission timing position with respect to a configuration message receiving position.

18. A network side device, comprising: a processor, a memory and a transceiver, wherein the transceiver is configured to receive and send data under control of the processor;

the memory is configured to store computer instructions; and the processor is configured to read the computer instructions in the memory and perform the method of claim 13.

19. A non-transitory computer readable storage medium, storing computer executable instructions, wherein the computer executable instructions are executed by a processor of a computer to perform the method of claim 1.

* * * * *